Virgil W. Vogel, deceased
By Virgil J. Vogel and Paul W. Vogel,
Co-executors, and Paul W. Vogel
INVENTOR.

3,711,298
PROCESS FOR PREPARING PACKAGED MEAT PRODUCTS FOR PROLONGED STORAGE
Virgil W. Vogel, deceased, by Virgil J. Vogel, co-executor, and Paul W. Vogel, Pekin, Ill., assignors to Bird Provision Co., Pekin, Ill.
Continuation of application Ser. No. 338,158, Jan. 16, 1964, which is a continuation-in-part of application Ser. No. 48,561, Aug. 10, 1960, now Patent No. 3,124,462. Divided and this application Jan. 21, 1971, Ser. No. 108,476
The portion of the term of the patent subsequent to Mar. 10, 1981, has been disclaimed
Int. Cl. A22c 18/00; B65b 25/06
U.S. Cl. 99—108      11 Claims

ABSTRACT OF THE DISCLOSURE

A process for preparing packaged meat in which the meat is removed from a freshly slaughtered carcass while at substantially bleeding temperature under ambient temperature conditions, comminuting the meat under these conditions, sealing the comminuted meat within a flexible packaging material before the meat temperature has declined to ambient temperature, and rapidly reducing the temperature of the packaged meat to a storage temperature.

---

This application is a continuation of copending application Ser. No. 338,158, filed Jan. 16, 1964 for Process for Preparing Packaged Meat Products for Prolonged Storage, now abandoned, which application was a continuation-in-part of and copending with U.S. Ser. No. 48,561 now U.S. Pat. No. 3,124,462.

The present invention relates to a process for preparing meat products having a prolonged storage life similar to the process described and claimed in prior copending application U.S. Ser. No. 48,561, filed Aug. 10, 1960, now Pat. No. 3,124,462, with respect to which the present application is a continuation-in-part.

As indicated in the prior copending application, the process of the present invention relates to the problem of preparing meat products so that they may be stored for prolonged periods of time without spoilage, discoloration and without loss of fresh flavor. Various meat handling and packaging processes have heretofore been proposed which fail to approach the degree of success obtained by the process of the present invention insofar as costs are concerned and the extent to which the storage life of the meat products may be prolonged. Furthermore, although prior processes were somewhat effective in retarding spoilage of the meat products, they were not successful in preserving the fresh quality of the meat as achieved by the process of the present invention.

It is therefore a major discovery of the present invention, that the fresh quality of meat products and storage life thereof may be prolonged for unexpectedly long periods by sealing the meat within relatively high air-impermeable packaging material now commercially available in the form of a flexible film or a laminate of flexible film materials having an oxygen permeability ranging from $0.01 \times 10^{-10}$ to $1.0 \times 10^{-10}$ cc.-mm./sec./cm.$^2$/cm. Hg at 30° C. such as disclosed in Pat. No. Re. 24,992, reissued May 30, 1961. Sealing of the meat within such packaging material, however, must be completed in accordance with the present invention, within a predetermined period immediately following slaughter of the animal from which the meat is obtained and before the meat has declined in temperature from the temperature of the animal carcass during bleeding, below a temperature value substantially above the storage temperature of the meat product. The procedure involved in the process of the present invention therefore represents a complete departure from practices heretofore adhered to in connection with the handling of meat inasmuch as the bled carcasses of slaughtered animals were normally chilled immediately after dressing to await processing and/or packaging.

The process of this invention as applied to one form of processing procedure, therefore involves the boning of an animal carcass after it has been properly bled or dressed and while it is still hot, the process then being completed within the shortest possible time so as to retain the highest possible temperatures whereby the meat products are maintained warm and fluent with a subsequent minimum of air voids prior to the packaging thereof within the packaging materials aforementioned. The meat products after being sealed within the packaging material are chilled for the first time within either a freezer or at a higher storage temperature of a storage shelf. Accordingly, the air impermeability of the packaging material as well as the temperatures and time within operative ranges of variations preceding the chilling operation, are critical factors in the process of this invention.

It is therefore an important object of this invention to provide a simple and practical method of preparing meat products for packaging within air-impermeable material to retain the fresh flavor qualities thereof and for substantially prolonging the storage life thereof.

Another object of the present invention is to provide a process for preparing and packaging beef products as well as mixtures of beef and pork products either in a ground condition or in chunks or cuts which may be stored for prolonged periods of time without loss of flavor and without spoilage or discoloration.

Additional objects of the present invention are to provide a method of preparing and packaging meat products whereby packaging is facilitated and meat shrinkage avoided.

A still further object of the present invention is to provide a process for preparing and packaging meat products so as to provide better inventory and merchandising control for both the meat processor and meat distributor or retailer.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

As indicated in the prior copending application, the described process applied to pork products, is not necessarily restricted thereto but may be applied to products obtained from other warm blooded animals. The pork product prepared in accordance with the process described in the aforementioned prior copending application, when stored in a freezer will have a prolonged storage life now known to be as long as three years. This is particularly significant inasmuch as the spoilage problem of meat products is known to be more pronounced in connection with pork than with other types of meat such as beef. For example, it is known that beef must undergo an ageing period before it acquires its optimum taste and tenderness whereas no such ageing period is applicable to pork. Furthermore, it is known that pork will show signs of rancidity and discoloration more rapidly than other meats. Accordingly, the process has been applied to beef products and found to be equally successful. Furthermore, similar success in connection with the preservation of freshness and the retardation of spoilage has been obtained in connection with meat products in chunk or cut form.

Figure 1:
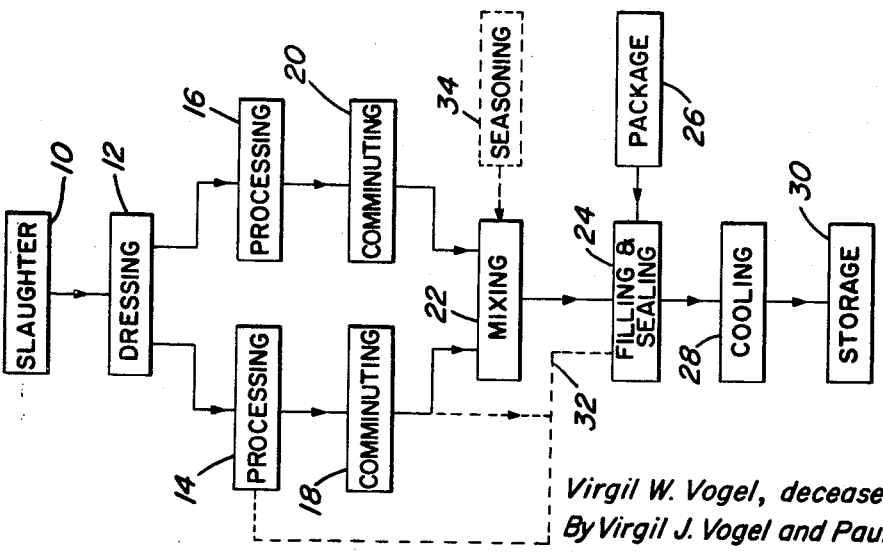
FIG. 1 is a flow diagram illustrating the processes of the present invention.

Referring now to FIG. 1, the process as specifically described in the prior copending application may be summarized. Animal carcasses delivered from the slaughter station 10 are dressed at the dressing station 12 at which point the meat is over 100° F. substantially above ambient or room temperature. However, unlike most procedures, the dressed carcass is immediately processed. As illustrated in FIG. 1, boned products, trimmings, cuts, etc., may be derived from two or more processing stations 14 and 16 at which they may be boned. The boned products could be either fat and lean components or products boned from different types of animals such as pork and beef sources. The boned products may also be by-product trimmings. The removed meat products exposed to ambient conditions are at an elevated temperature which is gradually declining as they are fed to comminuting stations 18 and 20. Metered proportions of the comminuted meat may be fed to a mixing station 22 from which a metered volume is fed to a packaging station 24 wherein a metered volume of the comminuted meat is enclosed and sealed within an air-impermeable material fed thereto from the packaging material storage 26. The packaged product from the packaging station 24 is then rapidly reduced in temperature at the cooling station 28 to a relatively low storage temperature below the ambient temperature before the product is placed in storage 30 at the storage temperature for subsequent use.

It will be appreciated, that the processed products in the form of chunks or primal cuts may be directly sealed within the air-impermeable package as indicated by dotted line 32 in the flow diagram of FIG. 1. Also, when preparing a ground meat product, seasoning from the seasoning station 34 may be mixed with the comminuted products at the mixing station if seasoning of the meat product is desired. The type of seasoning preferred is that set forth in the prior copending application in connection with the pork product. It should be appreciated, however, that the meat product need not be seasoned at all. Also, the use of certain flavorings such as sage may defeat the purposes of the present invention in preserving the fresh quality of the meat product as for example in connection with the preparation of pork products.

Figure 2:
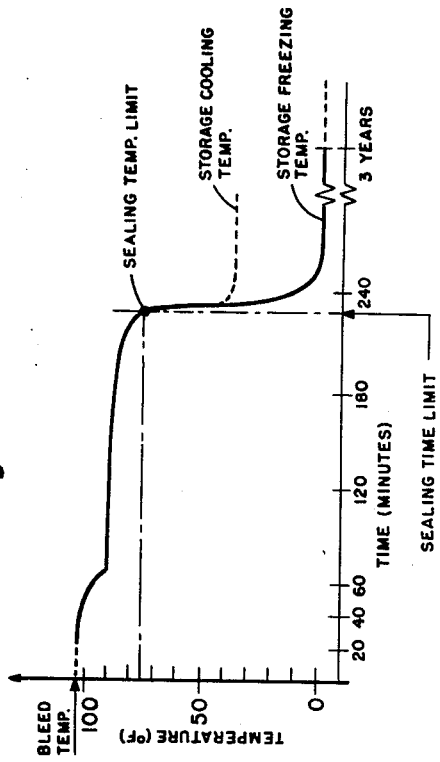
FIG. 2 is a graphical illustration of the conditions attendant to the processing of a typical meat product in accordance with the present invention.

Referring now to FIG. 2, it will be observed that the time and temperature conditions applicable to the process of the present invention are depicted. In connection with pork products, it has been found that the practice of the process as described with respect to FIG. 1, should be confined to a lower temperature limit substantially above room temperature, the meat product to be sealed within the air-impermeable package at this temperature or above. Accordingly, meat is permitted to decline gradually from the bleeding temperature to the lower limit and the preparation of the meat must therefore be confined to this temperature range. It has also been found in connection with pork products and one actual processing plant environment that the process to the point of mixing should be completed within approximately 3½ hours and before decline in temperature below 80° F. Such pork products after being sealed within the air-impermeable packages immediately thereafter are then rapidly reduced in temperature for the first time either to a storage freezing temperature or to a storage cooling temperature respectively. A maximum storage shelf life of at least seven weeks has been found applicable to pork products stored at the storage cooling temperature which is approximately 38° F. Unexpectedly longer storage periods for pork products have been found to be applicable to products stored at the storage freezing temperature of 0° F., such storage life extending as long as three years as depicted in FIG. 2.

It is apparent that various factors contribute to the extended storage life obtained for the product prepared in accordance with the process of the present invention. Firstly, the elevated temperatures of the meat exposed prior to sealing within the air-impermeable package enables the meat to fill the package without voids in view of the fluent state of the meat. In this regard, it has been found that any substantially lower temperature below the temperature limit aforementioned, produces an abrupt change in the density and fluency of meat when ground resulting in not only the entrapment of air voids in the package but also more difficult filling of the package with the metered volume of meat. Thus, an incidental advantage of the process of the present invention is the packaging of meat without any substantial shrinkage thereof as would occur in conneciton with the packaging of meat chilled before processing.

It has also been found, that prolongation of the exposure time of the meat even with the temperature maintained elevated above the temperature limit aforementioned, may not produce a reliably fresh product within the prolonged storage life. This may be attributable to the theory set forth in the prior copending application regarding the cellular activity of live tissues within the meat product which consume the small amount of oxygen that may be entrapped within the package. In this regard, it is known that rigor mortis is related to time.

The sealing of the meat product within an air-impermeable package is of course related to the aforementioned factors. Also, the conditions within the processing plant may affect the time and temperature limits to which the process is restricted. Thus, plant conditions may vary as to room temperature and airborne bacteria affecting the time limit after which accelerated spoilage of the meat occurs for a given decline in temperature of the meat. The important discovery of the present invention therefore, is the recognition that the preparation of the meat must be restricted to a predetermined time following slaughter during which the meat is exposed to ambient processing plant conditions and before the dissipation of the animal body heat occasioned by a gradual decline in temperature of the meat from bleeding temperature during this exposure period to a lower limit substantially above that of the storage temperature. These time and temperature limits will therefore vary with the conditions existing in the processing plant. It has been found that the same maximum storage life for the product will be obtained as long as the process is confined to the time and temperature limits established for the particular processing plant and that if these limits are exceeded by a small amount the resulting product may still have a long but reduced storage life and in most cases retain the fresh quality of the meat product during its storage life.

Figure 3:
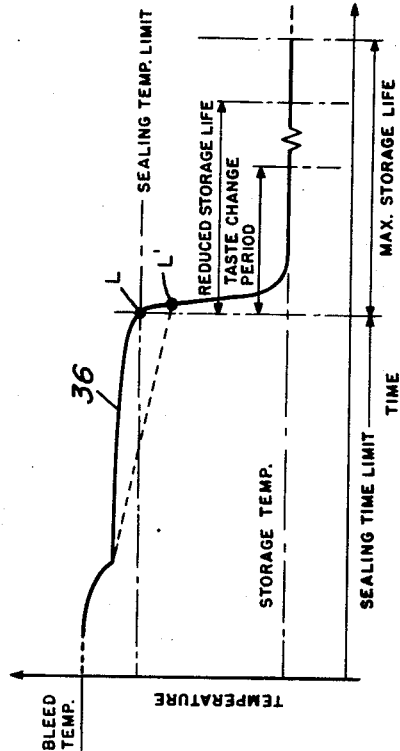
FIG. 3 is a graphical illustration similar to that of FIG. 2 illustrating variations contemplated as part of the present invention.

The process has been carried out in connection with beef products and found to be applicable as depicted, for example, by the time and temperature curve 36 in FIG. 3. In connection with beef, however, a slightly lower sealing temperature limit and higher sealing time limit has been found to be acceptable as, denoted by limit point L. The process when confined to such limits, has been found to produce a product having a maximum storage life. When the limits are exceeded as indicated for example by limit point L', in FIG. 3, a reduced storage life is obtainable which is still substantially prolonged. Also, there is a period during which the taste of the meat product changes, favorably in connection with beef products apparently in view of the ageing period hereinbefore mentioned. In this regard, the ability of the process of the present invention to preserve the fresh quality of the meat when the process is confined to the time and temperature limits, is demonstrated.

The favorable results obtained by use of the process in connection with beef products is readily demonstrated by tasting and smelling the product after prolonged storage and observing the color thereof. These favorable results have also been affirmed by scientific tests conducted by the American Meat Institute Foundation, the results of such tests being shown on the following chart:

| Samples | Temperature, time-weeks | Bacteria count (millions per gram of meat) | | | |
|---|---|---|---|---|---|
| | | −20° F. | | 35° F. | |
| | | 0 | 5½ | 0 | 5½ |
| Ground beef freezer stored for 4 weeks. | Unseasoned | 1.5 | 0.8 | 1.46 | 9.7 |
| | Seasoned | 0.73 | 0.6 | 0.58 | 0.45 |

The bacteria counts in the foregoing chart are well above acceptable values.

Also, tests were performed in connection with the packaging of pork chunks prepared and packaged pursuant to the process of the present invention. A rancidity test was conducted in connection therewith by the American Meat Institute Foundation, the results of such tests being set forth in the following chart:

| Sample | Rancidity test [1] (original peroxide value, me./kg.), freezer storage time | |
|---|---|---|
| | 4 months | 8 months |
| Pork chunks | 0.77 | 1.30 |

[1] 20.0 me./kg. indicates rancidity.

Samples of the pork chunks were also cooked after prolonged storage and the flavor and taste thereof found to be exceptionally fresh and flavorful. Thus, products held in storage for exceptionally prolonged periods of time when prepared and packaged in accordance with the process of the present invention, have been found to have relatively low bacteria counts and also found to be organoleptically acceptable.

In addition to the foregoing prolonged storage advantages of the process of the present invention, it has been found that the meat product is superior colorwise to other products held in a cooling or freezing shelf for much less periods of time. In fact, the time conditions set forth in U.S. Pat. No. Re.24,992 for controlling the development of the incipient bloom, color and organoleptic characteristics of comminuted fresh meats, does not apply to meats prepared in accordance with the process of the present invention, the discovery of the aforesaid patented invention being apparently restricted to meat products prepared from thawed beef. Further, products prepared in accordance with the process of the present invention after prolonged storage will retain the fresh looking color after longer air exposure periods, than any product prepared from thawed meat whether or not it is sealed within the air-impermeable package in less than thirty minutes following grinding of the meat pursuant to this other patented process.

Additional advantages of the process of the present invention, involve facilitated packaging of the meat product in view of its fluency at the elevated temperatures and avoidance of any meat shrinkage. The abrupt change in the meat density and fluency that occurs when the process limits are exceeded prevent achievement of the foregoing advantage and also prevents filling of the air-impermeable package or sausage causing with the metered volume of meat where ground meat is being packaged.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

It is claimed:

1. In a method of preparing meat products packaged in a flexible, air-impermeable packaging material having an oxygen permeability ranging from $0.01 \times 10^{-10}$ to $1.0 \times 10^{-10}$ cc.-mm./sec./cm.$^2$/cm. Hg at 30° C., for storage at a relatively low storage temperature and wherein the meat is obtained from freshly slaughtered carcasses at a relatively high bleeding temperature, the improvement comprising the steps of: removing the meat from said carcasses substantially at bleeding temperature; comminuting the meat for consumer use during an exposure period when the temperature thereof declines from said bleeding temperature under ambient temperature conditions; and sealing said comminuted meat within said air-impermeable packaging material before the temperature of the meat has declined below ambient temperature, said exposure period being terminated before accelerated spoilage of the meat occurs when exposed to said ambient conditions above the storage temperature.

2. A method of preparing a fresh meat product for prolonged storage while retaining the fresh quality of the meat, which comprises the steps of removing meat from freshly slaughtered animal carcasses under an ambient temperature condition below the animal temperature of the freshly slaughtered carcasses; packaging the meat within an air impermeable flexible material while the meat is still warm and before the temperature of the meat has declined to a lower limit above the ambient temperature condition and before the onset of accelerated spoilage which would occur after prolonged exposure of the meat to said ambient temperature condition so as to eliminate the oxygen that may be entrapped within the package; and reducing the temperature of the sealed meat to a storage temperature below said ambient temperature condition.

3. The method of claim 2 wherein said packaging material has an oxygen permeability of about $0.01 \times 10^{-10}$ to $1.0 \times 10^{-10}$ cc.-mm./sec./cm.$^2$/cm. Hg at 30° C.

4. The method of claim 2 wherein the meat is removed from the animal substantially at its bleeding temperature.

5. The method of claim 2 wherein the meat is comminuted prior to being sealed within the air impermeable material.

6. The method of claim 2 wherein said meat is derived from more than one kind of animal.

7. The method of claim 2 wherein said meat is sealed within said material within 3½ hours from slaughter.

8. The method of claim 5 wherein said meat is packaged before its temperature has declined below 80° F.

9. The method of claim 2 wherein the temperature of the packaged meat is reduced below freezing subsequent to sealing.

10. The method of claim 5 wherein said comminuted meat is warm and fluent when sealed within said air-impermeable material.

11. A method of preparing and packaging a ground fresh meat product to preserve the fresh qualities of the meat over prolonged storage and to avoid substantial shrinkage during packaging, which comprises:
  (a) removing meat from a freshly slaughtered animal carcass;
  (b) grinding the removed fresh meat while still warm to produce a fluent product;
  (c) sealing the ground fresh meat while still warm and fluent and before accelerated spoilage begins in an air impermeable package so as to fill the package without substantial voids; and
  (d) reducing the temperature of the sealed fresh meat to a storage temperature.

References Cited

UNITED STATES PATENTS

| Re. 24,992 | 5/1961 | Ellies | 99—174 |
| 2,874,060 | 2/1959 | Turner et al. | 99—194 |
| 2,238,546 | 4/1941 | Williams et al. | 99—174 |
| 3,124,462 | 3/1964 | Vogel et al. | 99—109 |

HYMAN LORD, Primary Examiner

U.S. Cl. X.R.

99—107, 174, 194